(12) United States Patent
Kageyama

(10) Patent No.: US 10,850,569 B2
(45) Date of Patent: Dec. 1, 2020

(54) PNEUMATIC TIRE

(71) Applicant: Sumitomo Rubber Industries, Ltd., Kobe (JP)

(72) Inventor: Naoki Kageyama, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 217 days.

(21) Appl. No.: 15/926,521

(22) Filed: Mar. 20, 2018

(65) Prior Publication Data

US 2018/0290498 A1 Oct. 11, 2018

(30) Foreign Application Priority Data

Apr. 11, 2017 (JP) ................... 2017-078359

(51) Int. Cl.
*B60C 11/03* (2006.01)
*B60C 11/12* (2006.01)
*B60C 11/13* (2006.01)

(52) U.S. Cl.
CPC ...... *B60C 11/1204* (2013.01); *B60C 11/0304* (2013.01); *B60C 11/0309* (2013.01); *B60C 11/0332* (2013.01); *B60C 11/1259* (2013.01); *B60C 11/1369* (2013.01); *B60C 2011/039* (2013.01); *B60C 2011/0341* (2013.01); *B60C 2011/0358* (2013.01); *B60C 2011/0374* (2013.01); *B60C 2011/0381* (2013.01); *B60C 2011/1209* (2013.01); *B60C 2011/1213* (2013.01); *B60C 2200/06* (2013.01)

(58) Field of Classification Search
CPC ................. B60C 11/0311; B60C 11/12; B60C 2011/1254
See application file for complete search history.

(56) References Cited

U.S. PATENT DOCUMENTS

| 5,200,008 | A | * | 4/1993 | Enterline | ............... B60C 11/01 152/209.23 |
| 2004/0020577 | A1 | * | 2/2004 | Hirai | .................. B60C 11/0318 152/526 |
| 2005/0150582 | A1 | * | 7/2005 | Matsumura | ............ B60C 11/01 152/209.18 |
| 2015/0273949 | A1 | * | 10/2015 | Arai | .................... B60C 11/0316 152/209.18 |

FOREIGN PATENT DOCUMENTS

JP      2010-18113 A    1/2010
WO  WO-2016121874 A1 *  8/2016  ............ B60C 11/01

* cited by examiner

*Primary Examiner* — Robert C Dye
*Assistant Examiner* — Farah Taufiq
(74) *Attorney, Agent, or Firm* — Birch, Stewart, Kolasch & Birch, LLP

(57) ABSTRACT

A shoulder lateral groove 5 comprises an inner lateral groove portion 7 intersecting a shoulder main groove 3S, an outer lateral groove portion 8 intersecting a tread edge (Te), and a sipe portion 9 connecting between the inner lateral groove portion 7 and the outer lateral groove portion 8. The outer lateral groove portion 8 has a bent portion 10 and extends so as to connect between the tread edge (Te) and the sipe portion 9.

14 Claims, 5 Drawing Sheets

PNEUMATIC TIRE

TECHNICAL FIELD

The present invention relates to a pneumatic tire which can be suitably used particularly for a pickup vehicle and which can improve uneven wear resistance performance of shoulder blocks while securing on-snow traction performance.

BACKGROUND ART

For example, pickup vehicles used in North America are often used for towing trailers and the like in addition to being used as normal passenger cars. Further, pickup vehicles are used for running on snowy road surfaces as well as dry road surfaces and wet road surfaces.

Thereby, block patterns are frequently used for tires to be mounted on this type of vehicles in order to ensure on-snow performance (see Japanese unexamined Patent Application Publication No. 2010-018113, for example).

However, by being used for towing trailers and the like, the tires are subjected to large force in front-back direction, therefore, heal and toe wear tends to occur more than normal usage for passenger cars. In particular, the heal and toe wear is more likely to occur in shoulder blocks.

Therefore, it is suggested to eliminate shoulder lateral grooves to change shoulder land regions to ribs extending continuously in a tire circumferential direction, and form a plurality of sipes in the ribs. However, there is a problem that it is difficult to secure the on-snow performance, especially the on-snow traction performance up to a satisfying level.

SUMMARY OF THE INVENTION

An object of the present invention is to provide a pneumatic tire capable of improving the uneven wear resistance performance of the shoulder blocks while securing the on-snow traction performance.

In one aspect of the present invention, a tire comprises a tread portion divided into a plurality of land regions including a shoulder land region arranged on a side of a tread edge by a plurality of main grooves including a shoulder main groove extending in a tire circumferential direction and arranged on the side of the tread edge, wherein the shoulder land region is divided into a plurality of shoulder blocks by a plurality of shoulder lateral grooves crossing the shoulder land region, each of the shoulder lateral grooves comprises an inner lateral groove portion intersecting the shoulder main groove, an outer lateral groove portion intersecting the tread edge, and a sipe portion connecting between the inner lateral groove portion and the outer lateral groove portion, and the outer lateral groove portion has an bent portion and extends so as to connect between the tread edge and the sipe portion.

In another aspect of the invention, it is preferred that the land regions include a middle land region arranged adjacently to the shoulder land region on an inner side in a tire axial direction, the middle land region is divided into a plurality of middle blocks by a plurality of middle lateral grooves crossing the middle land region, and an opening of each of the shoulder lateral grooves at an outer edge in the tire axial direction of the shoulder main groove at least partly overlaps with a virtual opening where an extended portion of one of the middle lateral grooves adjacent to the shoulder lateral groove intersects with the outer edge in the tire axial direction of the shoulder main groove, or a separation distance in the tire circumferential direction between the opening and the virtual opening is not more than 5.0 mm.

In another aspect of the invention, it is preferred that a groove depth of each of the inner lateral groove portion and the outer lateral groove portion is not less than 50% of a groove depth of the shoulder main groove.

In another aspect of the invention, it is preferred that a length (Li) in the tire axial direction of the inner lateral groove portion is not less than 3 mm, a length (Lo) in the tire axial direction of the outer lateral groove portion is not less than 5% of a tread width TW, and a length (Lm) in the tire axial direction of the sipe portion is not less than 15% of a length LS in the tire axial direction of the shoulder lateral groove.

The "tread width TW" refers to a maximum width in the tire axial direction of a tread ground contacting area of the tire which is mounted on a standard rim, inflated to a standard pressure, vertically in contact with a flat surface with zero camber angle by being loaded with a standard load. Further, the "tread edge" refers to an axially outermost position of the tread ground contacting area.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO. The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO. However, in a case of a passenger car, the standard pressure is 180 kPa. The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

DESCRIPTION OF THE PREFERRED EMBODIMENT

An embodiment of the present invention will now be described in conjunction with accompanying drawings.

Figure 1:
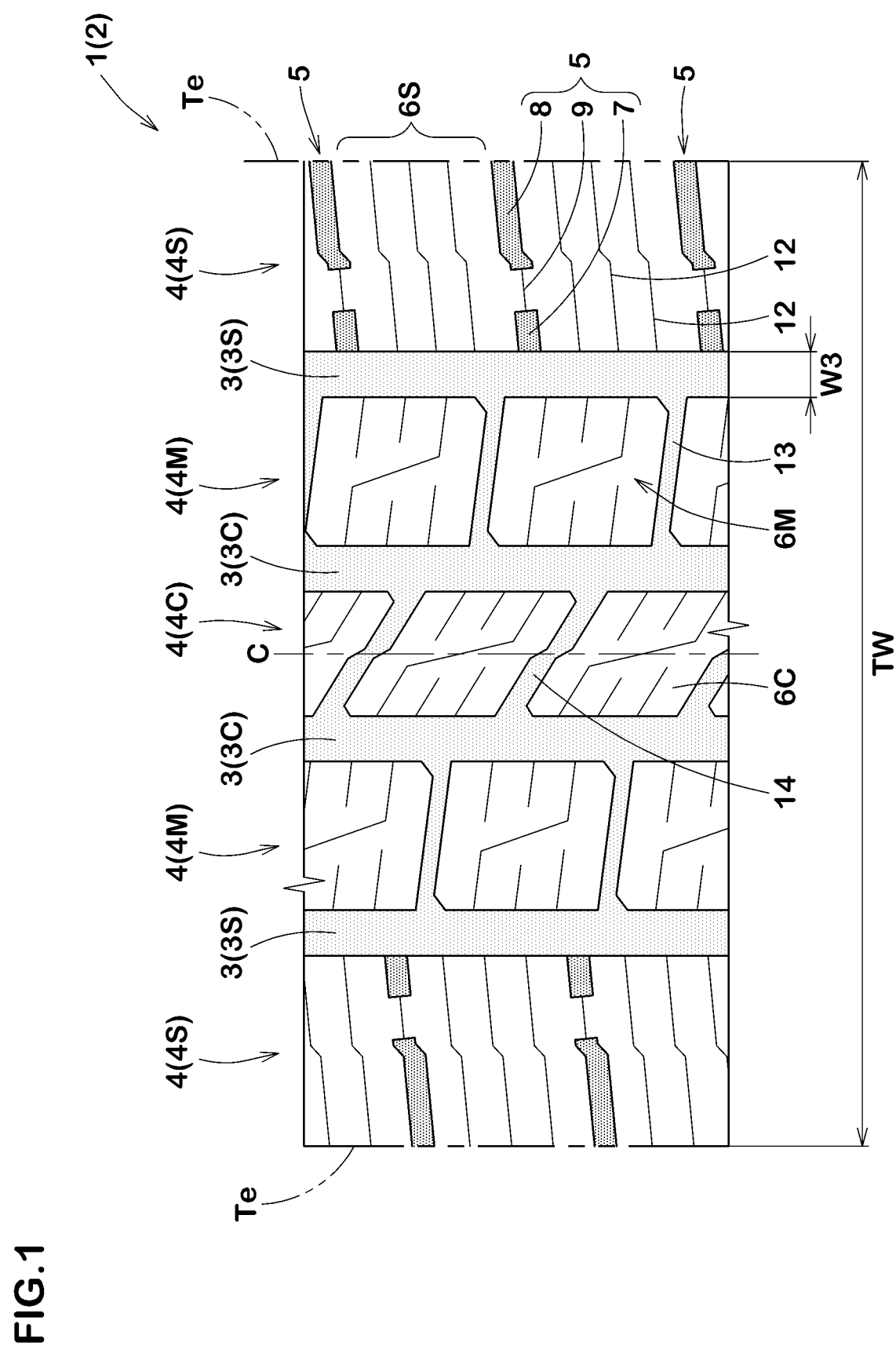
FIG. 1 is a development view of a tread portion of a pneumatic tire according to an embodiment of the present invention.

As shown in FIG. 1, in a pneumatic tire 1 in this embodiment, a tread portion 2 is provided with a plurality of main grooves 3 extending continuously in the tire circumferential direction, therefore, the tread portion 2 is divided into a plurality of land regions 4.

The main grooves 3 include shoulder main grooves 3S each arranged closest to respective one of tread edges (Te). In this embodiment, the main grooves 3 are composed of a pair of the shoulder main grooves 3S and two crown main grooves 3C each arranged on an inner side in a tire axial direction of respective one of the shoulder main grooves 3S.

The land regions 4 include shoulder land regions 4S each arranged so as to have respective one of the tread edges (Te). In this embodiment, the land regions 4 are composed of the shoulder land regions 4S, a pair of middle land regions 4M each arranged between one of the shoulder main grooves 3S and its adjacent one of the crown main grooves 3C, and a crown land region 4C arranged between the crown main grooves 3c.

In this embodiment, each of the main grooves 3S and 3C is configured as a straight groove extending straight in the tire circumferential direction. However, one or both of the main grooves 3S and 3C may be configured as zigzag grooves (including wavy grooves). Further, groove widths W3 and groove depths D3 (shown in FIG. 4) of the main grooves 3S and 3C can be variously determined according to conventional practice. In this embodiment, the groove width W3 is set to be in a range of from 3% to 7% (for example, 4.5%) of a tread width TW and the groove depth D3 is set to be in a range of from 10 to 15 mm (for example, 12.0 mm).

Each of the shoulder land regions 4s is provided with a plurality of shoulder lateral grooves 5 extending so as to cross the shoulder land region 4S. Thereby, each of the shoulder land regions 4s is divided into a plurality of shoulder blocks 6s arranged in the tire circumferential direction.

Figure 2A:
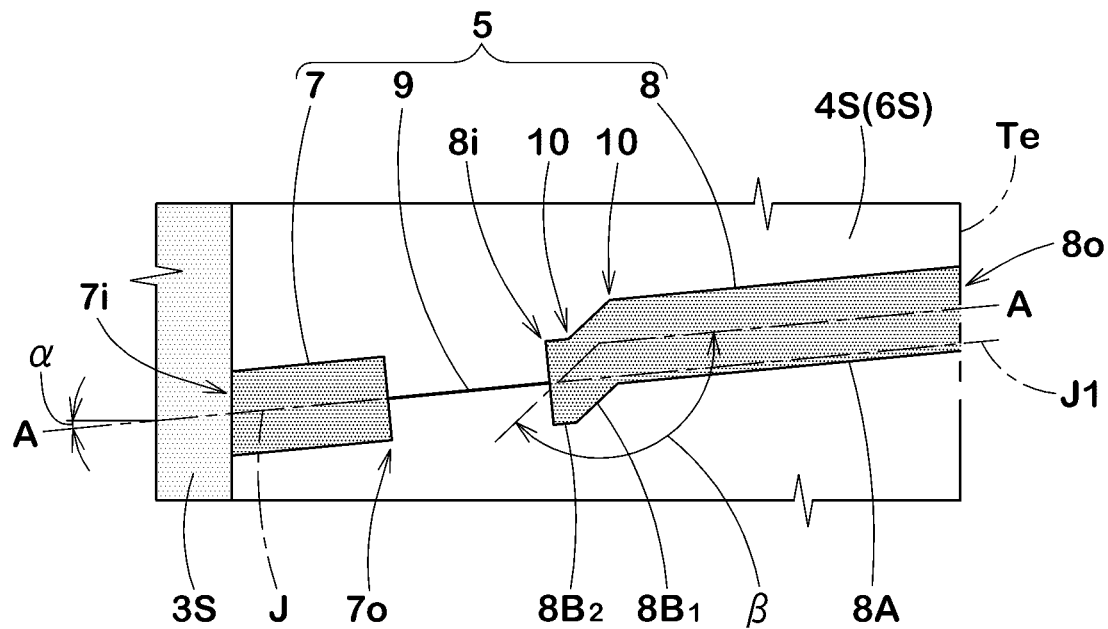
FIG. 2A is an enlarged view illustrating one of shoulder lateral grooves.

As shown in FIG. 2A, each of the shoulder lateral grooves 5 is composed of an inner lateral groove portion 7, an outer lateral groove portion 8, and a sipe portion 9.

The inner lateral groove portion 7 has an inner end portion (7i) intersecting the shoulder main groove 3s, extends axially outwardly from the inner end portion (7i), and terminates within the shoulder land regions 4S to form an outer end portion (7o). From a point of view of the on-snow traction performance, an angle α of the inner lateral groove portion 7 with respect to the tire axial direction is preferably not more than 15 degrees, more preferably not more than 10 degrees. The angle α may be zero degrees. In this embodiment, a reference line (J) which is a groove center of the inner lateral groove portion 7 extends straight. However, the reference line (J) may be an arc-like curved line close to a straight line.

The outer lateral groove portion 8 has an outer end portion (8o) intersecting the tread edge (Te), extends axially inwardly from the outer end portion (8o), has bent portions 10, and terminates within the shoulder land region 4s to form an inner end portion (8i). The outer lateral groove portion 8 in this embodiment has a main portion 8A extending axially inwardly from the outer end portion (8o), a first sub portion 8B1 connected with the main portion 8A via a first bent portion 10, and a second sub portion 8B2 connected with the first sub portion 8B1 via a second bent portion 10.

The main portion 8A in this embodiment extends parallel to an extended line 31 of the reference line (J). Further, the first sub portion 8B1 is inclined at an angle β with respect to the main portion 8A. From a point of view of increasing strength of snow blocks, it is preferred that the angle ii is in a range of from 120 to 160 degrees. Further, the second sub portion 8B2 extends parallel to the main portion 8A. Note that the term "parallel" includes an angular difference not more than 5 degrees. The outer lateral groove portion 8 can also be formed only with the main portion 8A and the first sub portion 8B1 excluding the second sub portion 8B2.

The sipe portion 9 extends between the outer end portion (7o) of the inner lateral groove portion 7 and the inner end portion (8i) of the outer lateral groove portion 8. In this embodiment, groove centers of the inner lateral groove portion 7, the sipe portion 9, and the second sub portion 8B2 are aligned in a straight line and pass through the reference line (J) and the extended line J1 thereof.

In the shoulder lateral grooves 5 configured as such, when force in the front-back direction is applied to the tread portion 2, openings of the sipe portions 9 are closed. Thereby, the shoulder blocks 6S adjacent to each other in the tire circumferential direction support each other, therefore, collapse thereof is suppressed.

Figure 3:
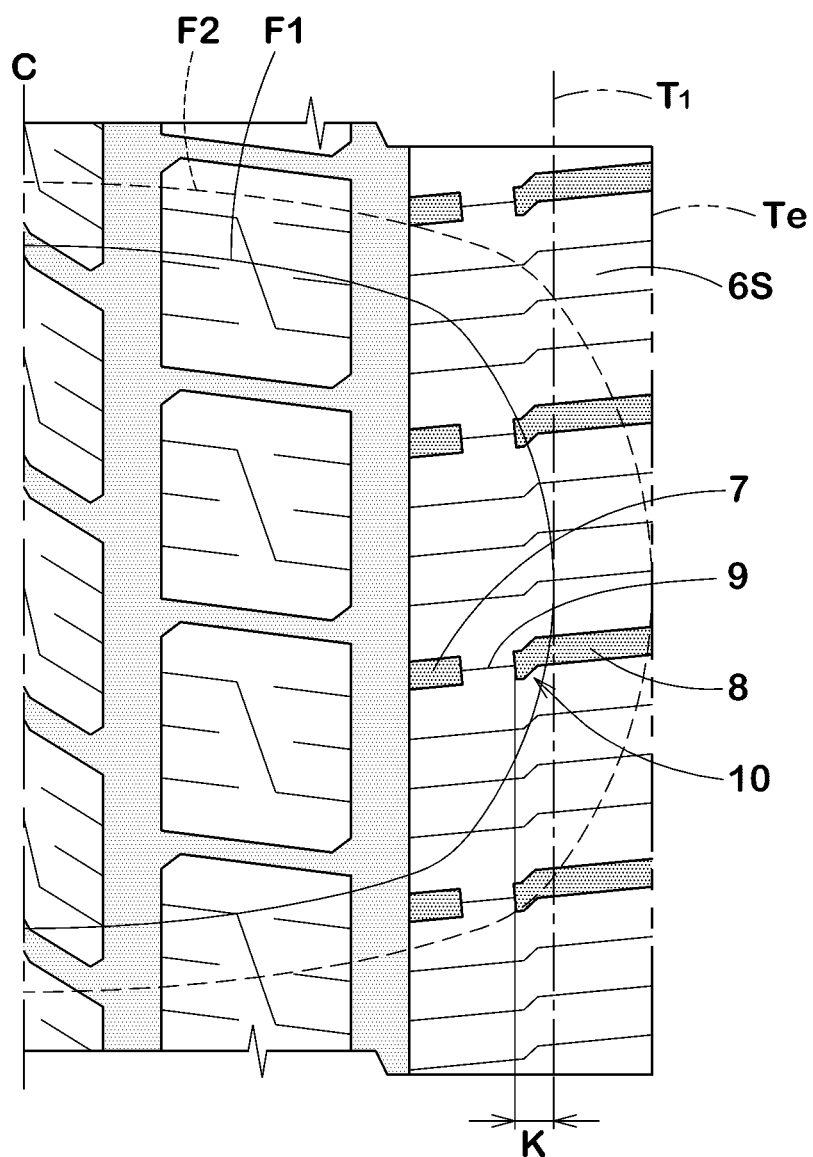
FIG. 3 is a part of the development view illustrating ground contacting shapes of a tire on a dry road surface and a snowy road surface when a cargo bed of a vehicle on which the tire is mounted is empty.

FIG. 3 conceptually shows a ground contacting shape F1 of the tire on a dry road surface when a cargo bed of the vehicle on which the tire is mounted is empty and a ground contacting shape F2 of the tire on a snowy road surface when the cargo bed is empty. As shown in the ground contacting shape F1, since load is small when the cargo bed is empty, a ground contacting surface of the tire 1 does not spread to the tread edges (Te) but spreads only to the vicinity of the middle of the shoulder blocks 6S in a width direction thereof. The sipe portions 9 are positioned in the vicinity of the ground contacting edge T1 when the cargo bed is empty, therefore, the collapse of the shoulder blocks 6S can be effectively suppressed when the cargo bed is empty, thereby, the heal and toe wear can be effectively suppressed.

On the other hand, the sipe portions 9 cause decrease in groove volume of the shoulder lateral grooves 5, therefore, it is possible that they cause decrease in snow shearing force. However, when the cargo bed is empty, which is disadvantageous in on-snow traction, as shown in the ground contacting shape F2 on a snowy road surface, the outer lateral groove portions 8 newly contact with ground, therefore, it is possible to form snow blocks. Thereby, the decrease of the groove volume caused by the sipe portions 9 is overcome, therefore, it is possible to minimize the decrease of the on-snow traction performance. In addition, since the outer lateral groove portions 8 have the bent portions 10, the strength of snow blocks formed by the outer lateral groove portions 8 can be increased, therefore, the snow shearing force is increased, thereby, it is possible that the snow traction is increased. Further, it is possible that the sipe portions 9 exert edge effect in the traction direction. Furthermore, by providing the sipe portions 9, the shoulder lateral grooves 5 open when they leave the road surface, therefore, it is possible that snow discharging performance is increased, thereby, it is possible that stable on-snow traction performance is exerted.

Figure 2B:
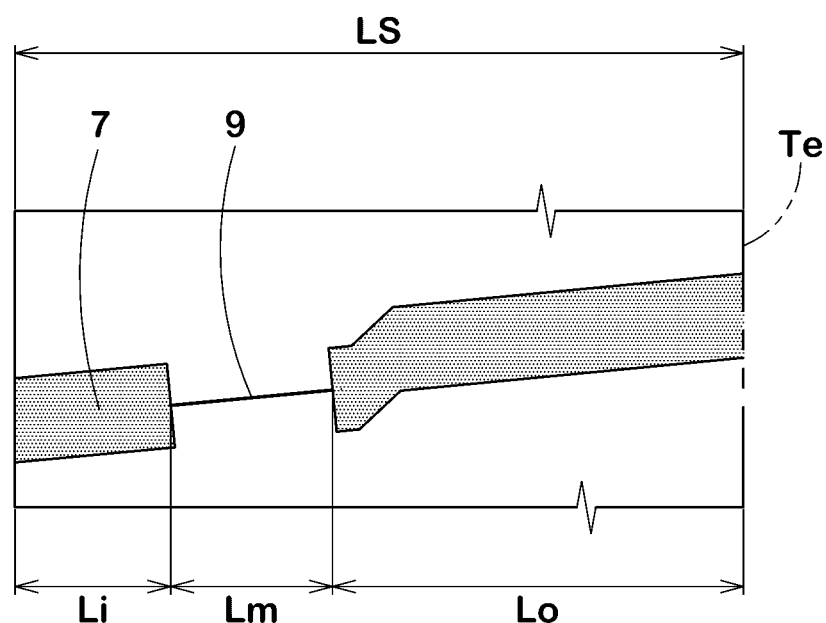
FIG. 2B is an enlarged view illustrating one of shoulder lateral grooves.

As shown in FIG. 2B, a length (Lm) in the tire axial direction of the sipe portion 9 is preferably not less than 15%, more preferably not less than 20% of a length LS in the tire axial direction of the shoulder lateral groove 5. If the length (Lm) is less than 15% of the length LS, the collapse of the shoulder blocks 6S cannot be sufficiently suppressed, therefore, the suppression effect of the heal and toe wear becomes insufficient.

Further, a length (Li) in the tire axial direction of the inner lateral groove portion 7 is preferably not less than 3 mm, more preferably not less than 5 mm. When the length (Li) is less than 3 mm, the forming position of the sipe portion 9 deviates axially inwardly from the position of the ground contacting edge T1 (shown in FIG. 3) on a dry road surface when the cargo bed is empty, therefore, the suppression effect of the heal and toe wear becomes insufficient. Or, the lengths (Lm) of the sipe portions 9 are increased, therefore, the on-snow traction performance is largely decreased.

Furthermore, a length (Lo) in the tire axial direction of the outer lateral groove portion 8 is preferably not less than 5%, more preferably not less than 8%, further preferably not less than 10% of the tread width TW (shown in FIG. 1). If the length (Lo) is less than 5% of the tread width TW, new formation of the snow blocks by the outer lateral groove portions 8 becomes insufficient when running on a snowy road surface when the cargo bed is empty. Thereby, the on-snow traction performance is largely decreased.

Note that the lengths (Lm), (Li), and (Lo) are interrelated. Therefore, when any one of the lengths (Lm), (Li), and (Lo) is too large, other lengths cannot satisfy the above ranges. Thereby, an upper limit of each of the length (Lm), (Li), and (Lo) is not specifically limited.

The suppression effect of the heal and toe wear and improvement effect of the on-snow traction performance by the shoulder lateral grooves 5 are affected by the position of the ground contacting edge T1 on a dry road surface when the cargo bed is empty. Therefore, it is preferred that a distance (K) (shown in FIG. 3) in the tire axial direction between the position of the ground contacting edge T1 and the inner end portion (8i) of the outer lateral groove portion 8 is not more than 7.0 mm in order to exert the suppression effect of the heal and toe wear and the improvement effect of the on-snow traction performance more effectively.

Note that the position of the ground contacting edge T1 on a dry road surface when the cargo bed is empty can be determined by an axially outermost position of a ground contacting area of the tire which is mounted on the standard rim, inflated to the standard pressure, vertically in contact with a flat surface with zero camber angle by being loaded with 45% of the standard load.

Figure 4:
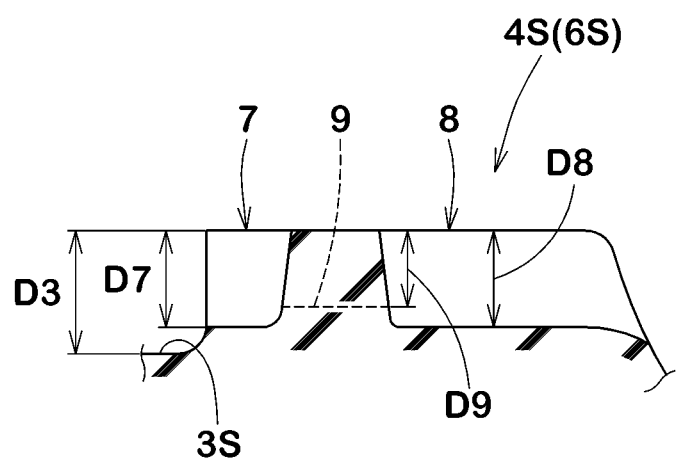
FIG. 4 is a cross-sectional view taken along A-A line of FIG. 2A.

FIG. 4 is a cross-sectional view taken along A-A line of FIG. 2A. In order to secure the strength of snow blocks and the snow shearing force by the shoulder lateral grooves 5, each of a groove depth D7 of the inner lateral groove portion 7 and a groove depth D8 of the outer lateral groove portion 8 are preferably not less than 50%, more preferably not less than 80% of the groove depths D3 of the shoulder main groove 3S. Note that upper limits of the groove depth D7 and D8 are preferably not more than 100% of the groove depth D3. Although the groove depths D7 and D8 may be different from each other, it is preferred that they are equal to each other. Further, it is preferred that a depth D9 of the sipe portion 9 is not less than 50% of the groove depth D3 and not more than the groove depths D7 and D8.

As shown in FIG. 1, each of the shoulder blocks 6S in this embodiment is provided with at least one sipe 12, a plurality (for example, three) of the sipes 12 in this embodiment, each crossing the shoulder blocks 6S. The sipe 12 extends parallel to the shoulder lateral groove 5.

Next, each of the middle land regions 4M is provided with a plurality of middle lateral grooves 13 each crossing the middle land region 4M. Thereby, each of the middle land regions 4M is divided into a plurality of middle blocks 6M arranged in the tire circumferential direction. The middle lateral grooves 13 in this embodiment are inclined in a direction different from the shoulder lateral grooves 5 with respect to the tire axial direction. Each of the middle lateral grooves 13 in this embodiment extends in a straight line, but it is also possible that each of the middle lateral grooves 13 is configured to be curved in an arc shape close to a straight line.

Figure 5:
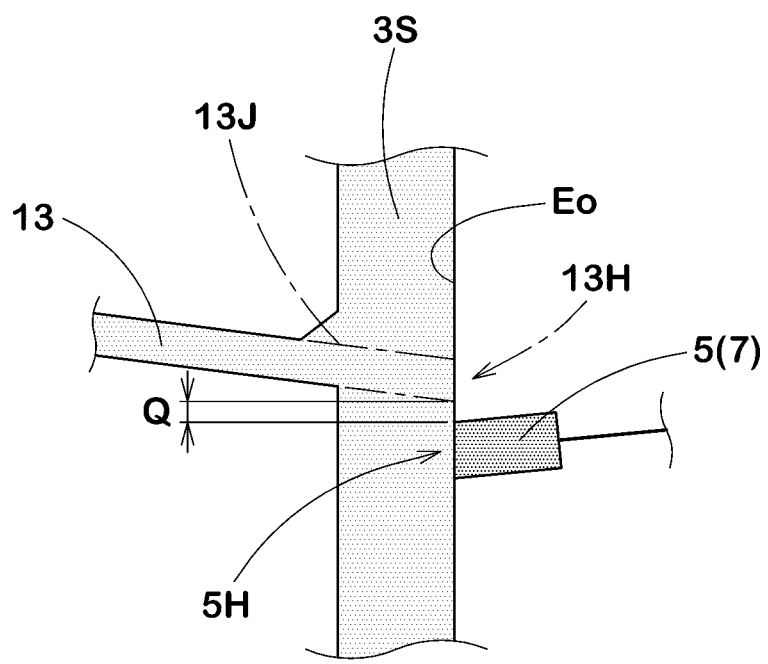
FIG. 5 is an enlarged view illustrating positional relationship of openings of one of shoulder lateral grooves and one of middle lateral grooves.

An opening 5H of the shoulder lateral groove 5 at an outer edge (Eo) in the tire axial direction of the shoulder main groove 3s at least partly overlaps with a virtual opening 13H where an extended portion 13J of one of the middle lateral grooves 13 adjacent to the shoulder lateral groove 5 intersects with the outer edge (Eo), or, as shown in FIG. 5, in the case where they do not overlap, it is preferred that a separation distance (Q) in the tire circumferential direction between the openings 5H and 13H is not more than 5.0 mm.

Thus, by having the openings 5H and 13H partly overlapped with each other or having the separation distance (Q) not more than 5.0 mm, it is possible that the snow blocks formed by the shoulder main groove 3s, the middle lateral groove 13, and the shoulder lateral groove 5 are connected in a roughly crisscross shape to form a firm snow block body, therefore, it is possible that the large snow shearing force is obtained.

As shown in FIG. 1, the crown land region 4c in this embodiment is divided into a plurality of crown blocks 6C arranged in the tire circumferential direction by a plurality of crown lateral grooves 14 each crossing the crown land region 4C. However, the crown land region 4C may be formed as a rib extending continuously in the tire circumferential direction. It is preferred that the crown lateral grooves 14 in this embodiment are inclined in the same direction as the middle lateral grooves 13 with respect to the tire axial direction. Further, it is preferred that an angle of each of the crown lateral grooves 14 with respect to the tire axial direction is larger than an angle of each of the middle lateral grooves 13 with respect to the tire axial direction in order to exert grip performance in a good balance in the tire axial direction and the tire circumferential direction.

While detailed description has been made of the tire as an especially preferred embodiment of the present invention, the present invention can be embodied in various forms without being limited to the illustrated embodiment.

Working Example (Example)

Pneumatic tires of size LT265/70R17 having the basic tread pattern shown in FIG. 1 were made by way of test according to the specifications listed in Table 1.

Each of the test tires was tested for the on-snow performance and the uneven wear resistance performance (heal and toe wear resistance performance) of the shoulder blocks.

In Reference 1, each of the shoulder lateral grooves is formed with the same groove width as the inner and the outer lateral groove portions over the entire length of the shoulder lateral groove.

In Reference 2, the shoulder lateral grooves are formed as sipes over the entire length thereof.

In Reference 3, no sipe portions are provided, thus the inner and the outer lateral groove portions are not connected.

In Reference 4, the bent portions are not formed in the outer lateral groove portions.

In Reference 5, no lateral groove portions are formed.

Common specifications are as follows.

Tread width TW: 200 mm

Axial length LS of Shoulder lateral groove: 42.7 mm

Groove depth D3 of Main groove: 12.0 mm

Angle β of Bent portion: 140 degrees

<Uneven Wear Resistance Performance of Shoulder Blocks>

Wear energy of the shoulder block was measured by using a wear energy bench test system under the following conditions. The measurement results are indicated by an index based on Reference 1 being 100, wherein the larger the numerical value, the better the uneven wear resistance performance is.

Tire rim: 17×8.0 JJ
Tire pressure: 520 kPa
Tire load: 6.56 kN

<On-Snow Performance>

By using an inside drum having an inner peripheral surface covered with snow, traction values of the test tires were measured under the following conditions.

The measurement results are indicated by an index based on Reference 1 being 100, wherein the larger the numerical value, the better the on-snow traction performance is.

Tire rim: 17×8.077
Tire pressure: 520 kPa
Tire load: 6.56 kN

TABLE 1

| <Shoulder lateral groove> | Ref. 1 | Ref. 2 | Ex. 1 | Ref. 3 | Ref. 4 | Ex. 2 | Ex. 3 | Ex. 4 |
|---|---|---|---|---|---|---|---|---|
| Length (Li) of Inner lateral groove portion [mm] | 0 | 0 | | 9.1 | | 5 | 3 | 9.1 |
| Length (Lm) of Sipe portion [mm] | 0 | 42.7 | 9.3 | 0 | | 9.3 | | |
| Ratio of Length (Lm)/Length (LS) of Shoulder lateral groove [%] | 0 | 100 | 22 | 0 | | 22 | | |
| Length (Lo) of Outer lateral groove portion [mm] | 42.7 | 0 | | 24.2 | | 28.3 | 30.3 | 24.2 |
| Ratio of Length (Lo)/Tread width Tw [%] | 21 | 0 | | 12 | | 14 | 15 | 12 |
| Depths D7 and D8 of Inner and Outer lateral groove portions [mm] | | | | 11 | | | | |
| Ratio of Groove depths D7/D3 [%] | | | | 92 | | | | |
| Presence or Absence of Bent portion | | absence | | presence | absence | | | presence |
| Separation distance (Q) between Openings [mm] | 22.3 | | | 1.8 | | | | 22.3 |
| Uneven wear resistance performance of Shoulder blocks | 100 | — | 120 | 120 | 120 | 120 | 120 | 120 |
| On-snow performance (On-snow traction performance) | 100 | 80 | 95 | 85 | 87 | 93 | 90 | 92 |

| <Shoulder lateral groove> | Ex. 5 | Ref. 5 | Ex. 6 | Ex. 7 | Ex. 8 |
|---|---|---|---|---|---|
| Length (Li) of Inner lateral groove portion [mm] | | | 9.1 | | |
| Length (Lm) of Sipe portion [mm] | 9.3 | | 6.4 | 4.4 | 9.3 |
| Ratio of Length (Lm)/Length (LS) of shoulder lateral groove [%] | 22 | | 15 | 10 | 22 |
| Length (Lo) of outer lateral groove portion [mm] | 10.3 | 0 | | 24.2 | |
| Ratio of Length (Lo)/Tread width Tw [%] | 5 | 0 | | 12 | |
| Depths D7 and D8 of Inner and Outer lateral groove portions [mm] | | | 11 | | 6 |
| Ratio of Groove depths D7/D3 [%] | | | 92 | | 50 |
| Presence or Absence of Bent portion | | | presence | | |
| separation distance (Q) between openings [mm] | | | 1.8 | | |
| Uneven wear resistance performance of Shoulder blocks | 122 | 122 | 118 | 112 | 121 |
| On-snow performance (on-snow traction performance) | 89 | 86 | 97 | 99 | 87 |

As shown in Table 1, it can be confirmed that the tires as Examples can greatly improve the uneven wear resistance performance of the shoulder blocks while minimizing the deterioration of the on-snow performance (on-snow traction performance).

The invention claimed is:

1. A pneumatic tire comprising:
a tread portion divided into a plurality of land regions including a shoulder land region arranged on a side of a tread edge by a plurality of main grooves including a shoulder main groove extending in a tire circumferential direction and arranged on the side of the tread edge, wherein
the shoulder land region is divided into a plurality of shoulder blocks by a plurality of shoulder lateral grooves crossing the shoulder land region,
each of the shoulder lateral grooves comprises an inner lateral groove portion intersecting the shoulder main groove, an outer lateral groove portion intersecting the tread edge, and a sipe portion connecting between the inner lateral groove portion and the outer lateral groove portion,
the outer lateral groove portion has a bent portion and extends so as to connect between the tread edge and the sipe portion,
the land regions include a middle land region arranged adjacently to the shoulder land region on an inner side in a tire axial direction,
the middle land region is divided into a plurality of middle blocks by a plurality of middle lateral grooves crossing the middle land region,
an opening of each of the shoulder lateral grooves at an outer edge in the tire axial direction of the shoulder main groove at least partly overlaps with a virtual region, or a separation distance in the tire circumferential direction between the opening of the shoulder lateral groove and the virtual region is not more than 5.0 mm,
the virtual region is an extension of a groove opening of the middle lateral groove adjacent to the closest shoulder lateral groove that intersects with the outer edge in the tire axial direction of the shoulder main groove,
the outer lateral groove portion has a second bent portion, and
the outer lateral groove portion has a main portion extending axially inwardly from an outer end portion intersecting the tread edge, a first sub portion is connected with the main portion via the bent portion, and a second sub portion is connected with the first sub portion via the second bent portion, wherein
the second sub portion extends parallel to the main portion.

2. The pneumatic tire according to claim 1, wherein a groove depth of each of the inner lateral groove portion and the outer lateral groove portion is not less than 50% of a groove depth of the shoulder main groove.

3. The pneumatic tire according to claim 1, wherein
a length (Li) in the tire axial direction of the inner lateral groove portion is not less than 3 mm,
a length (Lo) in the tire axial direction of the outer lateral groove portion is not less than 5% of a tread width TW, and
a length (Lm) in the tire axial direction of the sipe portion is not less than 15% of a length LS in the tire axial direction of the shoulder lateral groove.

4. The pneumatic tire according to claim 1, wherein the sipe portion extends linearly over its entire length.

5. The pneumatic tire according to claim 1, wherein the shoulder main groove extends straight in the tire circumferential direction.

6. The pneumatic tire according to claim 1, wherein a groove width of the shoulder main grove is in a range of from 3% to 7% of a tread width.

7. The pneumatic tire according to claim 1, wherein an angle of the inner lateral groove portion with respect to the tire axial direction is not more than 15 degrees.

8. The pneumatic tire according to claim 1, wherein the main portion extends parallel to an extended line of a reference line which is a groove center of the inner lateral groove portion.

9. The pneumatic tire according to claim 1 wherein the first sub portion is inclined at an angle in a range of from 120 to 160 degrees with respect to the main portion.

10. The pneumatic tire according to claim 1 wherein groove centers of the inner lateral groove portion, the sipe portion, and the second sub portion are aligned in a straight line and pass through a reference line and an extended line of the reference line, and
the reference line is the groove center of the inner lateral groove portion.

11. The pneumatic tire according to claim 1, wherein each of a groove depth of the inner lateral groove portion and a groove depth of the outer lateral groove portion is not more than 100% of a groove depth of the shoulder main groove.

12. The pneumatic tire according to claim 1, wherein a depth of the sipe portion is not less than 50% of a groove depth of the shoulder main groove and not more than a groove depth of the inner lateral groove portion and a groove depth of the outer lateral groove portion.

13. The pneumatic tire according to claim 1, wherein each of the shoulder blocks is provided with at least one sipe extending parallel to the shoulder lateral groove so as to cross the shoulder block.

14. A pneumatic tire comprising:
a tread portion divided into a plurality of land regions including a shoulder land region arranged on a side of a tread edge by a plurality of main grooves including a shoulder main groove extending in a tire circumferential direction and arranged on the side of the tread edge, wherein
the shoulder land region is divided into a plurality of shoulder blocks by a plurality of shoulder lateral grooves crossing the shoulder land region,
each of the shoulder lateral grooves comprises an inner lateral groove portion intersecting the shoulder main groove, an outer lateral groove portion intersecting the tread edge, and a sipe portion connecting between the inner lateral groove portion and the outer lateral groove portion,
the outer lateral groove portion has a bent portion and extends so as to connect between the tread edge and the sipe portion,
the land regions include a middle land region arranged adjacently to the shoulder land region on an inner side in a tire axial direction,
the middle land region is divided into a plurality of middle blocks by a plurality of middle lateral grooves crossing the middle land region,
an opening of each of the shoulder lateral grooves at an outer edge in the tire axial direction of the shoulder main groove at least partly overlaps with a virtual region, or a separation distance in the tire circumferential direction between the opening of the shoulder lateral groove and the virtual region is not more than 5.0 mm, and the virtual region is an extension of a groove opening of the middle lateral groove adjacent to the closest shoulder lateral groove that intersects with the outer edge in the tire axial direction of the shoulder main groove, the outer lateral groove portion has a second bent portion, and the outer lateral groove portion has a main portion extending axially inwardly from an outer end portion intersecting the tread edge, a first sub portion is connected with the main portion via the bent portion, and a second sub portion is connected with the first sub portion via the second bent portion, wherein the pneumatic tire is mounted to a vehicle having a cargo bed, and a distance in the tire axial direction between the position of a ground contacting edge when the cargo bed is empty and an inner end portion of the outer lateral groove portion is not more than 7 mm.

* * * * *